(No Model.) 2 Sheets—Sheet 1.
H. W. STURGES.
BICYCLE LAMP.
No. 590,919. Patented Sept. 28, 1897.
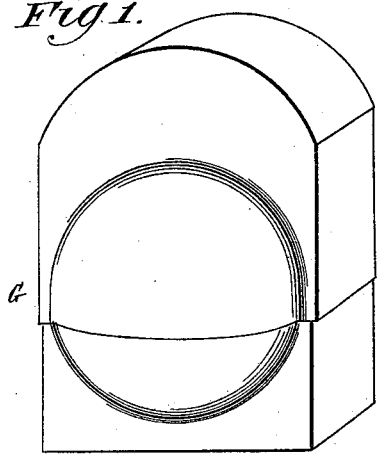
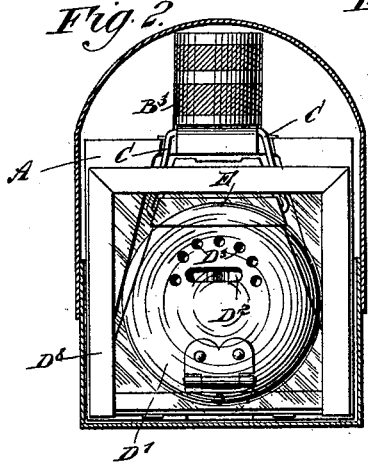
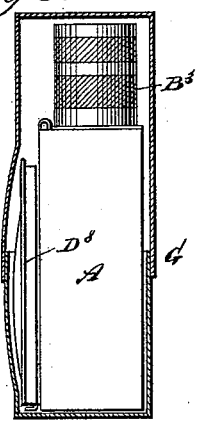
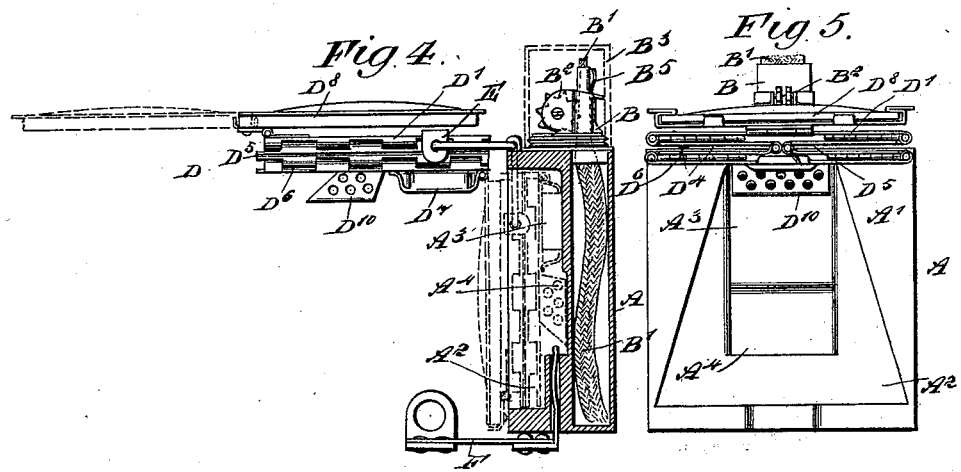
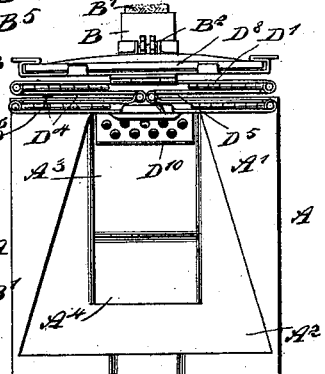
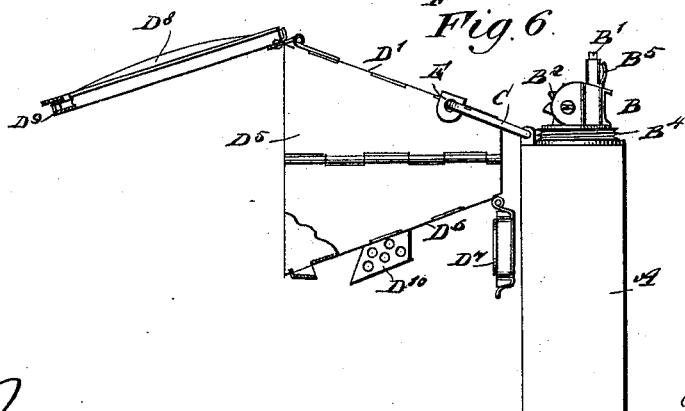
WITNESSES:
INVENTOR
H. W. Sturges
BY
ATTORNEYS.

(No Model.) 2 Sheets—Sheet 2.
H. W. STURGES.
BICYCLE LAMP.
No. 590,919. Patented Sept. 28, 1897.
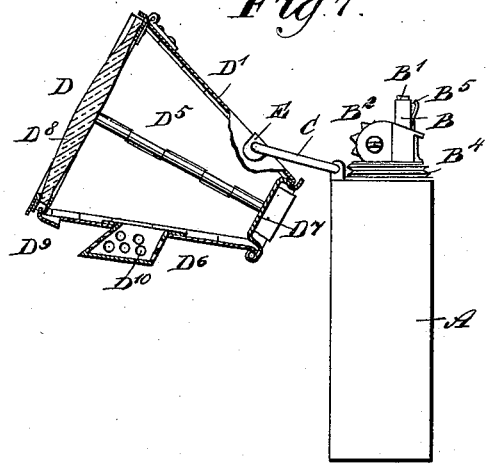
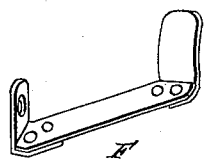
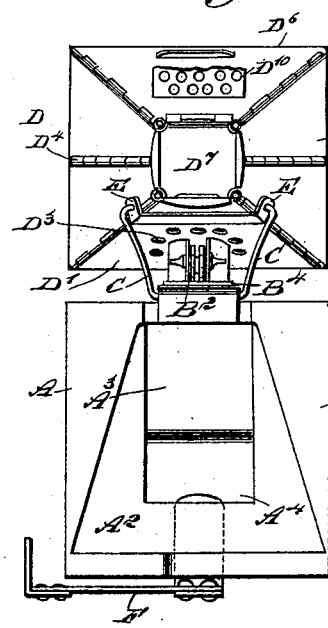
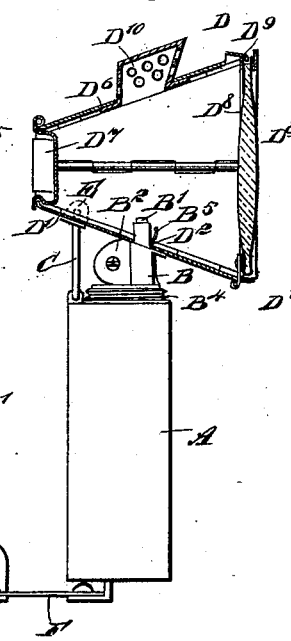
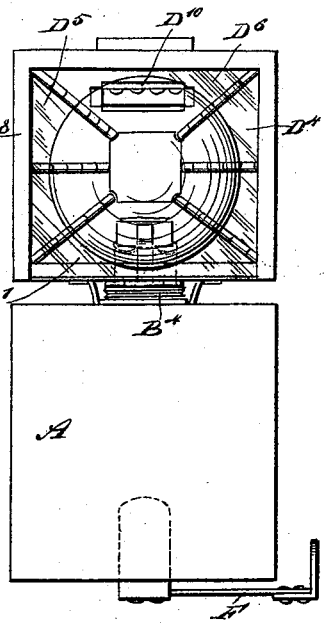
WITNESSES:
INVENTOR
H. W. Sturges
BY
ATTORNEYS.

UNITED STATES PATENT OFFICE.

HARRY W. STURGES, OF BROOKLYN, NEW YORK.

BICYCLE-LAMP.

SPECIFICATION forming part of Letters Patent No. 590,919, dated September 28, 1897.

Application filed February 11, 1897. Serial No. 622,896. (No model.)

*To all whom it may concern:*

Be it known that I, HARRY W. STURGES, of Brooklyn, in the county of Kings and State of New York, have invented a new and Improved Bicycle-Lamp, of which the following is a full, clear, and exact description.

The object of the invention is to provide a new and improved bicycle-lamp arranged to permit of readily folding it up into a comparatively small space for conveniently carrying the lamp in the pocket, the lamp being constructed to permit of quickly extending it and attaching it to the bicycle whenever desired.

The invention consists principally of a fount having a burner and a recess in the back of the fount and a lamp-casing hinged to the said fount and adapted to be folded into the said recess.

The invention also consists of certain parts and details and combinations of the same, as will be fully described hereinafter and then pointed out in the claims.

Reference is to be had to the accompanying drawings, forming part of this specification, in which similar characters of reference indicate corresponding parts in all the figures.

Figure 1 is a perspective view of the box for containing the bicycle-lamp. Fig. 2 is a sectional elevation of the same with the folded lamp in position in the box. Fig. 3 is a transverse section of the box and the lamp contained therein. Fig. 4 is a sectional side elevation of the improvement with the lamp-casing partly extended. Fig. 5 is a rear end elevation of the same. Fig. 6 is a side elevation of the improvement with parts of the lamp-casing extended and parts in section. Fig. 7 is a similar view of the same with the parts in a different position. Fig. 8 is a sectional side elevation of the improvement in an extended position ready for use. Fig. 9 is a rear end elevation of the same. Fig. 10 is a front elevation of the same, and Fig. 11 is a perspective view of the bracket for attaching the lamp to the bicycle.

The improved bicycle-lamp is provided with a fount A, preferably made of sheet metal, and provided with a removable wick-tube B, containing the wick B', extending into the oil contained in the fount A and adapted to be raised and lowered by a suitable wick-raising device $B^2$, attached to the outer end of the wick-tube B, as illustrated in the drawings.

The outer portion of the wick-tube B and the raising device $B^2$ therefor are adapted to be covered whenever the lamp is not in use by means of a suitable cap $B^3$, secured on the threaded end $B^4$, formed on the tube B. (See Figs. 2, 3, 4, and 7.)

On the upper end of the fount A and at the back thereof is pivoted a bail C, adapted to support the lamp-casing D, the said bail being for this purpose provided at its free end with trunnions engaging lugs E, extending on the sides of the casing D, but attached to the bottom D' of the casing. (See Fig. 9.) The lamp-casing D is in the form of a truncated pyramid and has the continuous bottom D', previously mentioned, formed with an opening $D^2$ for a passage of the upper end of the wick-tube B, so that the outer end of the wick extends into the said casing, as plainly indicated in Fig. 8. The bottom D' is further provided with apertures $D^3$ to supply the burner in the casing with air necessary for proper combustion. The sides $D^4$ and $D^5$ of the casing are made in two parts pivotally connected with each other in a longitudinal direction, with the lower ends of the sides pivoted to the side edges of the bottom D' and with the upper ends of the sides pivotally connected with the top $D^6$ of the casing D. The sides $D^4$ and $D^5$ are adapted to fall inwardly, so as to draw the top downward to pull the casing into a comparatively small amount of space, as indicated in Figs. 4 and 5. The back $D^7$ of the casing D is hinged to the top $D^6$ at the rear end thereof, and the said back $D^7$ has its inner surface polished to form a reflector. The back $D^7$ is in the form of a cup, having its side flanges engaging the bottom, sides, and top of the casing D, so as to hold the said parts locked in an engaged position. The lower flange of the back $D^7$ is preferably formed into a suitable catch adapted to engage the rear and slightly-upturned edge of the bottom D', so as to lock the back $D^7$ in place on the casing. (See Fig. 8.)

The front $D^8$ of the casing D consists of a frame hinged to the bottom D' at the front end thereof, and the said frame contains a suitable lens, as indicated in Fig. 8. The free end of the front $D^8$ is provided with a suitable catch D⁹, adapted to engage the top D⁶, so as to lock the front in place. The frame of the front is adapted to abut with its sides, top, and bottom against the inner faces of the sides, top, and bottom of the casing D, so as to hold the said parts in an extended position to prevent the parts from collapsing during the time the lamp is in an extended position.

It is understood that the back D⁷ and the front D⁸ operate in conjunction with each other to hold the sides, top, and bottom of the casing D in an extended position.

On the top D⁶ of the casing D is arranged a perforated hood D¹⁰, located directly above the wick B' to permit the smoke and gases to readily pass out of the casing to the outer air.

In order to securely lock the casing D in place when passed over the wick-tube B, I provide the latter with a suitable spring-catch B⁵, adapted to engage the bottom D' of the casing. (See Fig. 8.) The back A' of the fount A is formed with a recess having a depression A², adapted to receive the folded-up casing D, the recess having a further depression A³ for the back D⁷ and a still further depression A⁴ for the hood D¹⁰. In the under side of the fount A is arranged a pocket or recess for the reception of a lug extending from the lamp-bracket F, constructed for properly securing the lamp to the bicycle in the usual manner.

Now it will be seen that by the arrangement described the lamp can be readily folded into a comparatively small space to allow the rider to conveniently carry the lamp in the pocket when not in use.

It will further be seen that the lamp can be readily extended and the wick ignited and the lamp used during the night-time for illuminating the path the bicycle is to travel.

When the lamp is in a folded-up condition, it can be readily inserted in a two-part box G, as shown in Figs. 1, 2, and 3. The cap B³, previously described, prevents spilling of the oil in the fount A and is removed previous to extending and setting up the lamp.

Having thus fully described my invention, what I claim as new, and desire to secure by Letters Patent, is—

1. A bicycle-lamp, comprising a fount having a burner, and a recess in the back of the fount, and a folding casing hinged to the said fount and adapted to be folded into the said recess, substantially as shown and described.

2. A bicycle-lamp, provided with a folding casing having a continuous bottom and a continuous top, sides made in parts hinged together and hinged to the said top and bottom, a back forming a reflector and engaging the said sides, top and bottom of the casing, and a front comprising a frame and a lens, and engaging the said sides, top and bottom of the casing, the front and the back serving to hold the parts in an extended position, substantially as shown and described.

3. A bicycle-lamp, comprising a fount having a wick-tube and wick-raising device, a bail hinged to the said fount, and a lamp-casing pivotally connected with the said bail and made in parts adapted to be folded one upon the other, the bottom of the casing having an opening for the passage of the upper end of the said wick-tube, substantially as shown and described.

4. A bicycle-lamp, comprising a fount having a wick-tube and wick-raising device, a bail hinged to the said fount, and a lamp-casing pivotally connected with the said bail and made in parts adapted to be folded one upon the other, the bottom of the casing having an opening for the passage of the upper end of the said wick-tube, and means substantially as described, for locking the said casing to the said wick-tube, as set forth.

5. A bicycle-lamp, comprising a fount having a wick-tube and wick-raising device, a bail hinged to the said fount, and a lamp-casing pivotally connected with the said bail and made in parts adapted to be folded one upon the other, the bottom of the casing having an opening for the passage of the upper end of the said wick-tube, and a perforated hood held on the top of the said casing directly above the said wick-tube, substantially as shown and described.

HARRY W. STURGES.

Witnesses:
THEO. G. HOSTER,
JNO. M. RITTER.